(12) United States Patent
Braun et al.

(10) Patent No.: US 12,237,650 B2
(45) Date of Patent: Feb. 25, 2025

(54) SPARK PLUG RESISTANCE ELEMENT AND SPARK PLUG

(71) Applicant: Robert Bosch GmbH, Stuttgart (DE)

(72) Inventors: Hubertus Braun, Renningen (DE); Benedikt Reinsch, Riederich (DE); Carsten Kuenzel, Tamm (DE); Corinna Vonau, Stuttgart (DE); Helene Kasjanow, Stuttgart (DE); Stefan Nufer, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 867 days.

(21) Appl. No.: 17/298,427

(22) PCT Filed: Nov. 26, 2019

(86) PCT No.: PCT/EP2019/082534
§ 371 (c)(1),
(2) Date: May 28, 2021

(87) PCT Pub. No.: WO2020/120121
PCT Pub. Date: Jun. 18, 2020

(65) Prior Publication Data
US 2022/0029390 A1    Jan. 27, 2022

(30) Foreign Application Priority Data
Dec. 13, 2018   (DE) .......................... 102018221690.8

(51) Int. Cl.
*H01T 13/41*   (2006.01)
*C03C 3/04*    (2006.01)
(Continued)

(52) U.S. Cl.
CPC ................ *H01T 13/41* (2013.01); *C03C 3/04* (2013.01); *C03C 4/00* (2013.01); *C03C 14/006* (2013.01);
(Continued)

(58) Field of Classification Search
CPC ... H01T 13/41; C03C 14/006; C03C 2204/00; C03C 2214/16; C03C 3/04; C03C 4/00
See application file for complete search history.

(56) References Cited

U.S. PATENT DOCUMENTS 2,864,884 A * 12/1958 Schwartzwalder .. H04B 15/025
                                                    252/521.3
3,915,721 A    10/1975 Kamigaito et al.
(Continued)

FOREIGN PATENT DOCUMENTS

DE    2446365 A1    4/1975
DE    3501558 A1    7/1985
(Continued)

OTHER PUBLICATIONS

International Search Report for PCT/EP2019/082534, Issued Jan. 31, 2020.

*Primary Examiner* — Shuangyi Abu Ali
(74) *Attorney, Agent, or Firm* — NORTON ROSE FULBRIGHT US LLP; Gerard A. Messina

(57) ABSTRACT

A spark plug resistance element that includes at least one inorganic amorphous oxide and at least one first inorganic crystalline oxide having a relative dielectric permittivity of at most 15. A spark plug that includes at least one spark plug resistance element is also described.

28 Claims, 2 Drawing Sheets

(51) Int. Cl.
*C03C 4/00* (2006.01)
*C03C 14/00* (2006.01)
(52) U.S. Cl.
CPC ...... *C03C 2204/00* (2013.01); *C03C 2214/16* (2013.01)

(56) References Cited

U.S. PATENT DOCUMENTS

| | | | |
|---|---|---|---|
| 6,320,317 | B1 | 11/2001 | Keller et al. |
| 2015/0318672 | A1 | 11/2015 | Iwasaki et al. |

FOREIGN PATENT DOCUMENTS

| | | | |
|---|---|---|---|
| EP | 1648062 | A1 | 4/2006 |
| EP | 2940811 | A1 | 11/2015 |
| JP | S5720404 | A | 2/1982 |
| JP | H02-239582 | A † | 9/1990 |
| WO | 2011030845 | A1 | 3/2011 |

\* cited by examiner
† cited by third party

SPARK PLUG RESISTANCE ELEMENT AND SPARK PLUG

FIELD

The present invention relates to a spark plug resistance element and to a spark plug having improved electromagnetic compatibility (EMC).

BACKGROUND INFORMATION

Spark plugs that are situated in a combustion chamber of an internal combustion engine have, in order to improve the electromagnetic compatibility of the spark plugs, a specific electrical resistance of 1 to 14 kΩ. Typically, here a resistance element is used that is connected at the terminal side to a foot of a center electrode, and that is made of a ceramic material, more precisely a glass. However, these conventional resistance elements do not show adequate electrical stability, considered over the useful life of the spark plug.

SUMMARY

In contrast, the spark plug resistance element according to an example embodiment of the present invention is distinguished by a lower emission of electromagnetic radiation, and thus by a higher electromagnetic compatibility, while retaining the same good electrical insulation, i.e., a high electrical resistance.

According to an example embodiment of the present invention, this is achieved in that the spark plug resistance element has at least one inorganic amorphous oxide and at least one first inorganic crystalline oxide having a relative dielectric permittivity of at most 15. The inorganic amorphous oxide forms a noncrystalline matrix in which the first inorganic crystalline oxide is embedded. Thus, there are two phases, which can be distinguished by transmission electron microscopy (TEM). It has been found that inorganic crystalline oxides having a relative dielectric permittivity of at most 15, and in particular of at most 12, reduce the electromagnetic radiation, and thus improve the electromagnetic compatibility of a spark plug. The relative dielectric permittivity is measured here according to ASTM D2149-13, using dielectric impedance spectroscopy. The higher the portion of the first inorganic crystalline oxide is, the higher the electromagnetic compatibility of the spark plug resistance element.

Preferred developments of the present invention are disclosed herein.

According to an advantageous development of the present invention, the first inorganic crystalline oxide is selected from ZnO, $SnO_2$, and mixtures thereof. ZnO and $SnO_2$ have very low values for the relative dielectric permittivity, namely 8 for ZnO and 12 for $SnO_2$. Thus, the use of these oxides produces a very high electromagnetic compatibility due to the reduced release of electromagnetic radiation. Other inorganic oxides, such as $Al_2O_3$, may also have a low relative permittivity, but are less strongly preferred due to their comparatively low electronic conductivity compared to $ZrO_2$, ZnO, and $SnO_2$. In particular, for this reason $Al_2O_3$ is preferably not used.

Advantageously, a glass, in particular a borosilicate glass, is used as inorganic amorphous oxide, because glasses are very stable and have good electrical insulation. They form a very good matrix for the first inorganic amorphous oxide. For the reasons named above, the glass is preferably a lithium borosilicate glass or a lithium-calcium borosilicate glass.

A particularly advantageous composition of a glass is as follows (the quantity indications relate to the total mass of this composition):
$SiO_2$: 35 to 65 mass %,
$B_2O_3$: 20 to 65 mass %,
$LiO_2$: 0.5 to 10 mass %,
$Na_2+K_2O$: at most 2 mass %,
CaO: 0 to 15 mass %,
SrO: 0 to 15 mass %,
BaO: 0 to 10 mass %,
MgO: 0 to 15 mass %,
$Al_2O_3$: 0 to 15 mass %, and
PbO: 0 to 5 mass %.

In order to improve the electrical resistance of the spark plug resistance element, it advantageously contains a second inorganic crystalline oxide. Like the first inorganic crystalline oxide, the second inorganic crystalline oxide is here embedded in the matrix of the inorganic amorphous oxide. Particularly advantageously, the second inorganic crystalline oxide is selected from $ZrO_2$, $TiO_2$, $HfO_2$, and mixtures thereof.

Further advantageously, the spark plug resistance element can include at least one inorganic non-oxidic material, the inorganic non-oxidic material being selected in particular from carbon black, graphite, carbides, metals, and mixtures thereof. The inorganic non-oxidic material has a comparatively high electrical conductivity, so that due to the mixing ratio of inorganic crystalline oxide to inorganic non-oxidic material, the resistance value of the spark plug resistance element, and thus also the resistance value of the spark plug, can be set particularly easily.

Due to their very good stability, the carbide is preferably selected from silicon carbide, tungsten carbide, iron carbide, boron carbide, titanium carbide, zirconium carbide, hafnium carbide, vanadium carbide, niobium carbide, tantalum carbide, molybdenum carbide, and mixtures thereof, and/or the metal is selected from iron, tungsten, titanium, copper, silver, and mixtures or alloys thereof.

The electromagnetic compatibility of the spark plug resistance element, with simultaneous high electrical resistance, can advantageously be further improved by setting the total content of the first inorganic crystalline oxide and second inorganic crystalline oxide to from 20 to less than 100 mass %, and in particular to 40 to 80 mass %, relative in each case to the total mass of the spark plug resistance element.

According to a further advantageous development, the content of inorganic amorphous oxide, here designated "a", is greater than 0 to 80 mass %, in particular 10 to 30 mass %, relative in each case to the total mass of the spark plug resistance element.

In order to improve the setting of the resistance value of the spark plug resistance element, the content of inorganic non-oxidic material, here designated "n", is preferably greater than 0 to 20 mass %, and in particular greater than 0 to 10 mass %, relative in each case to the total mass of the spark plug resistance element.

A particularly good, i.e., stable and electromagnetically highly compatible, combination of inorganic crystalline oxides is the combination of $ZrO_2$, ZnO, and $SnO_2$. The mass portions of these oxides are in particular distributed as follows: x mass % $ZrO_2$, y mass % ZnO, and z mass % $SnO_2$, where $0<x<0.99*c$, $0<y<c$ and $0<z<c$, where c=20 to 100 mass %, in particular 40 to 80 mass %, relative in each case to the total mass of the spark plug resistance element, and x+y+z=c.

Preferably, the spark plug resistance element contains no additional components in addition to at least one first inorganic crystalline oxide, at least one second inorganic crystalline oxide, at least one inorganic amorphous oxide, and at least one non-oxidic material. Thus, the following holds: a+c+n=100.

The present invention also provides a spark plug that includes at least one spark plug resistance element as disclosed above. Due to the high electromagnetic compatibility and the permanently stable and high electrical resistance of the spark plug resistance element, the spark plug according to the present invention is distinguished by low electromagnetic radiation.

BRIEF DESCRIPTION OF THE DRAWINGS

Below, exemplary embodiments of the present invention are described in detail with reference to the figures.

DETAILED DESCRIPTION OF EXAMPLE EMBODIMENTS

Figure 1:
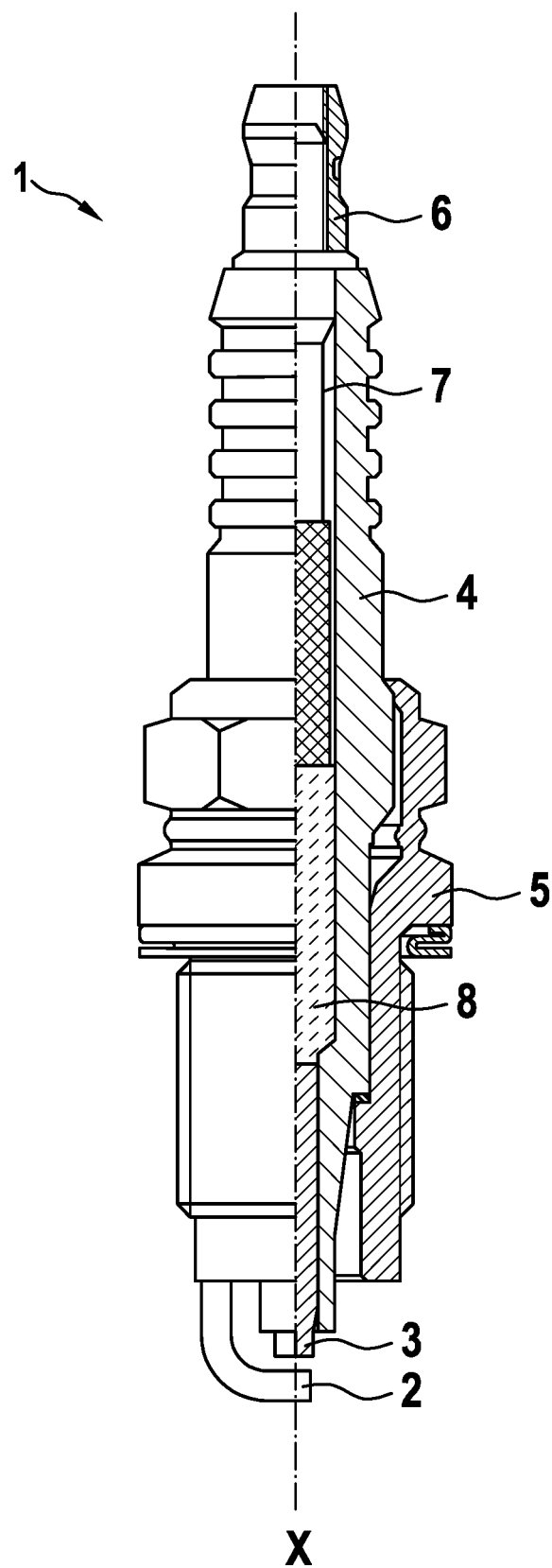
FIG. 1 shows a partly sectional view of a spark plug according to a first specific embodiment of the present invention.

In the Figures, only the main features of the present invention are shown. All other features are omitted for clarity. In addition, identical reference characters designate identical components.

As can be seen in FIG. 1, according to a first specific embodiment, spark plug 1 includes a ground electrode 2 and a center electrode 3. An insulator 4 is provided in such a way that center electrode 3 stands out somewhat from insulator 4, in a conventional manner. Insulator 4 itself is partly surrounded by a housing 5. Reference character 6 designates an electrical terminal screw. From electrical terminal screw 6, an electrically conductive connection is provided, via a terminal bolt 7 and a spark plug resistance element 8, to center electrode 3.

Figure 2:
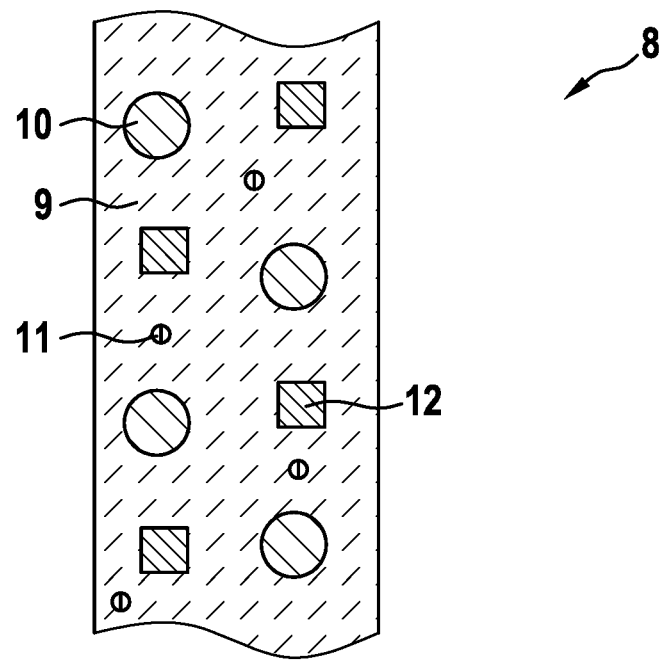
FIG. 2 shows a schematic sectional view of a spark plug resistance element according to a second specific embodiment of the present invention.

Spark plug resistance element 8, shown in detail in FIG. 2, improves the electromagnetic compatibility of spark plug 1 while maintaining a good value for the electrical resistance and high mechanical stability. In this way, low electromagnetic radiation is also achieved for spark plug 1.

FIG. 2 is a schematic sectional view of spark plug resistance element 8 of FIG. 1. Spark plug resistance element 8 includes at least one inorganic amorphous oxide 9 and at least one first inorganic crystalline oxide 10 having a relative dielectric permittivity of at most 15. Inorganic amorphous oxide 9 here forms a glass-type matrix in which first inorganic crystalline oxide 10 is embedded. First inorganic crystalline oxide 10 is in particular $ZnO$ or $SnO_2$ or a mixture thereof.

In addition, spark plug resistance element 8 includes at least one second inorganic crystalline oxide 11, second inorganic crystalline oxide 11 being selected in particular from $ZrO_2$, $TiO_2$, $HfO_2$, and mixtures thereof.

Preferably, first inorganic crystalline oxide 10 is a mixture of $ZnO$ and $SnO_2$, second inorganic crystalline oxide 11 is $ZrO_2$, and the mass portions of first inorganic crystalline oxide 10 and of second inorganic crystalline oxide 11 are as follows: x mass % $ZrO_2$, y mass % $ZnO$, and z mass % $SnO_2$, where $0<x<0.99*c$, $0<y<c$ and $0<z<c$, where c=20 to 100 mass %, in particular 40 to 80 mass %, relative in each case to the total mass of spark plug resistance element 8, and x+y+z=c.

In addition, spark plug resistance element 8 includes at least one inorganic non-oxidic material 12, the inorganic non-oxidic material 12 being selected in particular from carbon black, graphite, carbide, metals, and mixtures thereof. The content of inorganic non-oxidic material 12 is here in particular greater than 0 to 20 mass % and in particular greater than 0 to 10 mass %, relative in each case to the total mass of spark plug resistance element 8.

Spark plug resistance element 8 is distinguished by a very high electromagnetic compatibility, with good electrical resistance.

What is claimed is:

1. A spark plug resistance element, comprising:
   at least one inorganic amorphous oxide and at least one first inorganic crystalline oxide having a relative dielectric permittivity of at most 15;
   wherein the spark plug resistance element include x mass % $ZrO_2$, y mass % $ZnO$, and z mass % $SnO_2$, where $0<x<0.99*c$, $0<y<c$ and $0<z<c$, where c=20 to 100 mass %, relative in each case to a total mass of the spark plug resistance element, and x+y+z=c.

2. The spark plug resistance element as recited in claim 1, wherein the first inorganic crystalline oxide is selected from $ZnO$, $SnO_2$, and mixtures thereof.

3. The spark plug resistance element as recited in claim 1, wherein the inorganic amorphous oxide is a glass.

4. The spark plug resistance element as recited in claim 1, wherein the inorganic amorphous oxide is a borosilicate glass.

5. The spark plug resistance element as recited in claim 1, further comprising:
   at least one second inorganic crystalline oxide, the second inorganic crystalline oxide being selected from $ZrO_2$, $TiO_2$, $HfO_2$, and mixtures thereof.

6. The spark plug resistance element as recited in claim 1, further comprising:
   at least one inorganic non-oxidic material, the inorganic non-oxidic material being selected from carbon black, graphite, carbides, metals, and mixtures thereof.

7. The spark plug resistance element as recited in claim 6, wherein: (i) the carbide is selected from silicon carbide, tungsten carbide, iron carbide, boron carbide, titanium carbide, zirconium carbide, hafnium carbide, vanadium carbide, niobium carbide, tantalum carbide, molybdenum carbide, and mixtures thereof, and/or (ii) the metal is selected from iron, tungsten, titanium, copper, silver, and mixtures thereof.

8. The spark plug resistance element as recited in claim 5, wherein a total content of the first inorganic crystalline oxide and the second inorganic crystalline oxide is from 20 to less than 100 mass % relative in each case to a total mass of the spark plug resistance element.

9. The spark plug resistance element as recited in claim 5, wherein a total content of the first inorganic crystalline oxide and the second inorganic crystalline oxide is from 40 to 80 mass % relative in each case to a total mass of the spark plug resistance element.

10. The spark plug resistance element as recited in claim 1, wherein a content of the inorganic amorphous oxide is greater than 0 to 80 mass % relative in each case to the total mass of the spark plug resistance element.

11. The spark plug resistance element as recited in claim 1, wherein a content of the inorganic amorphous oxide is greater than 10 to 30 mass % relative in each case to the total mass of the spark plug resistance element.

12. The spark plug resistance element as recited in claim 6, wherein a content of inorganic non-oxidic material is greater than 0 to 20 mass % relative in each case to a total mass of the spark plug resistance element.

13. The spark plug resistance element as recited in claim 6, wherein a content of inorganic non-oxidic material is greater than 0 to 10 mass %, relative in each case to a total mass of the spark plug resistance element.

14. A spark plug resistance element, comprising:
at least one inorganic amorphous oxide and at least one first inorganic crystalline oxide having a relative dielectric permittivity of at most 15;
wherein the spark plug resistance element includes x mass % $ZrO_2$, y mass % ZnO, and z mass % $SnO_2$, where $0<x<0.99*c$, $0<y<c$ and $0<z<c$, where c=40 to 80 mass %, relative in each case to a total mass of the spark plug resistance element, and $x+y+z=c$.

15. A spark plug, comrpising:
a spark plug resistance element including at least one inorganic amorphous oxide and at least one first inorganic crystalline oxide having a relative dielectric permittivity of at most 15;
wherein the spark plug resistance element includes x mass % $ZrO_2$, y mass % ZnO, and z mass % $SnO_2$, where $0<x<0.99*c$, $0<y<c$ and $0<z<c$, where c=20 to 100 mass %, relative in each case to a total mass of the spark plug resistance element, and $x+y+z=c$.

16. A spark plug, comprising:
a spark plug resistance element including at least one inorganic amorphous oxide and at least one first inorganic crystalline oxide having a relative dielectric permittivity of at most 15;
wherein the spark plug resistance element includes x mass % $ZrO_2$, y mass % ZnO, and z mass % $SnO_2$, where $0<x<0.99*c$, $0<y<c$ and $0<z<c$, where c=40 to 80 mass %, relative in each case to a total mass of the spark plug resistance element, and $x+y+z=c$.

17. The spark plug as recited in claim 15, wherein the first inorganic crystalline oxide is selected from ZnO, $SnO_2$, and mixtures thereof.

18. The spark plug as recited in claim 15, wherein the inorganic amorphous oxide is a glass.

19. The spark plug as recited in claim 15, wherein the inorganic amorphous oxide is a borosilicate glass.

20. The spark plug as recited in claim 15, wherein the spark plug resistance element further comprises:
at least one second inorganic crystalline oxide, the second inorganic crystalline oxide being selected from $ZrO_2$, $TiO_2$, $HfO_2$, and mixtures thereof.

21. The spark plug as recited in claim 15, wherein the spark plug resistance element further comprises:
at least one inorganic non-oxidic material, the inorganic non-oxidic material being selected from carbon black, graphite, carbides, metals, and mixtures thereof.

22. The spark plug as recited in claim 21, wherein: (i) the carbide is selected from silicon carbide, tungsten carbide, iron carbide, boron carbide, titanium carbide, zirconium carbide, hafnium carbide, vanadium carbide, niobium carbide, tantalum carbide, molybdenum carbide, and mixtures thereof, and/or (ii) the metal is selected from iron, tungsten, titanium, copper, silver, and mixtures thereof.

23. The spark plug as recited in claim 20, wherein a total content of the first inorganic crystalline oxide and the second inorganic crystalline oxide is from 20 to less than 100 mass % relative in each case to a total mass of the spark plug resistance element.

24. The spark plug as recited in claim 20, wherein a total content of the first inorganic crystalline oxide and the second inorganic crystalline oxide is from 40 to 80 mass % relative in each case to a total mass of the spark plug resistance element.

25. The spark plug as recited in claim 15, wherein a content of the inorganic amorphous oxide is greater than 0 to 80 mass % relative in each case to the total mass of the spark plug resistance element.

26. The spark plug as recited in claim 15, wherein a content of the inorganic amorphous oxide is greater than 10 to 30 mass % relative in each case to the total mass of the spark plug resistance element.

27. The spark plug as recited in claim 21, wherein a content of the inorganic non-oxidic material is greater than 0 to 20 mass % relative in each case to a total mass of the spark plug resistance element.

28. The spark plug as recited in claim 21, wherein a content of the inorganic non-oxidic material is greater than 0 to 10 mass %, relative in each case to a total mass of the spark plug resistance element.

* * * * *